United States Patent
Ruilier et al.

(10) Patent No.: US 6,999,666 B2
(45) Date of Patent: Feb. 14, 2006

(54) FIBRE FOR COMPENSATION OF THE CUMULATIVE CHROMATIC DISPERSION IN A FIBRE WITH NEGATIVE CHROMATIC DISPERSION

(75) Inventors: Cyril Ruilier, Fontenay Aux Roses (FR); Sébastien Bigo, Massy (FR); José Chesnoy, Paris (FR); Pierre Sansonetti, Palaiseau (FR)

(73) Assignee: Draka Comteo B.V., Amsterdam (NL)

( * ) Notice: Subject to any disclaimer, the term of this patent is extended or adjusted under 35 U.S.C. 154(b) by 53 days.

(21) Appl. No.: 10/406,264

(22) Filed: Apr. 4, 2003

(65) Prior Publication Data

US 2003/0202761 A1   Oct. 30, 2003

(30) Foreign Application Priority Data

Apr. 29, 2002   (FR)   .................................. 02 05377

(51) Int. Cl.
*G02B 6/02* (2006.01)

(52) U.S. Cl. ..................................... 385/123
(58) Field of Classification Search ................ 385/123, 385/127, 128, 124
See application file for complete search history.

(56) References Cited

U.S. PATENT DOCUMENTS

| | | | | |
|---|---|---|---|---|
| 6,418,256 B1 * | 7/2002 | Danziger et al. | ............ | 385/123 |
| 6,526,209 B1 * | 2/2003 | Hasegawa et al. | .......... | 385/127 |
| 6,636,677 B2 * | 10/2003 | Hasegawa et al. | .......... | 385/127 |
| 6,766,088 B2 * | 7/2004 | Hasegawa et al. | .......... | 385/123 |

FOREIGN PATENT DOCUMENTS

| | | |
|---|---|---|
| EP | 1081514 A1 | 3/2001 |
| WO | WO 0051269 | 8/2000 |

* cited by examiner

*Primary Examiner*—John R. Lee
*Assistant Examiner*—Paul M. Gurzo
(74) *Attorney, Agent, or Firm*—Sughrue Mion, PLLC

(57) ABSTRACT

The fiber is adapted to compensation of the chromatic dispersion and chromatic dispersion slope of an optical fiber with negative chromatic dispersion. It has, in a propagation mode other than the fundamental mode, a positive chromatic dispersion and a negative chromatic dispersion slope.

Figure 4:
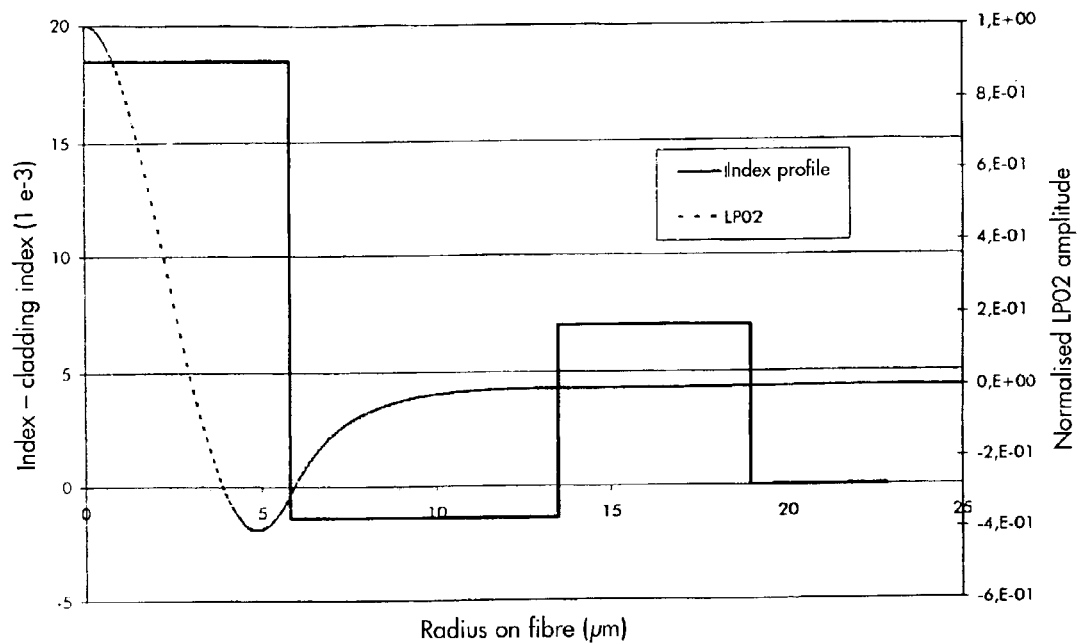

The fiber can be used in compensation dispersion modules or as line fiber, in transmission systems using line fiber with negative chromatic dispersion.

10 Claims, 2 Drawing Sheets

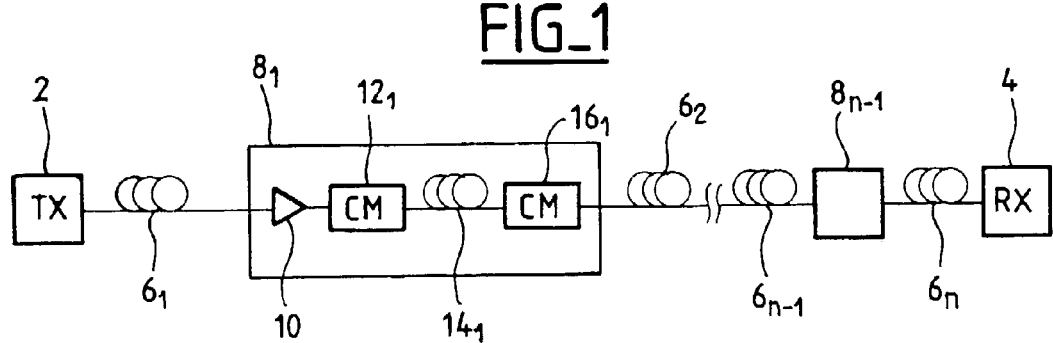
FIG_1
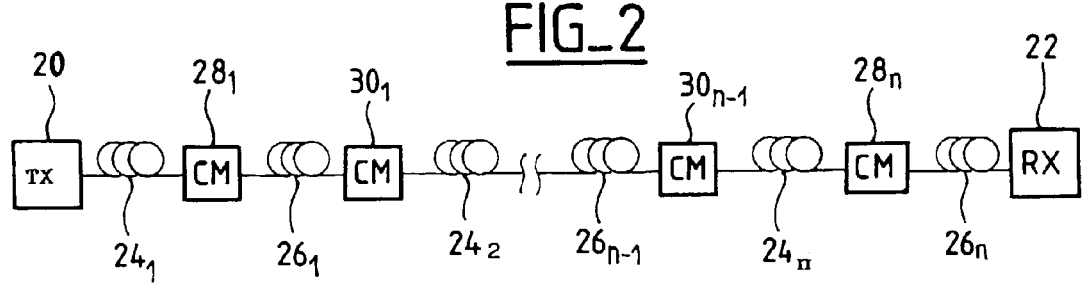
FIG_2
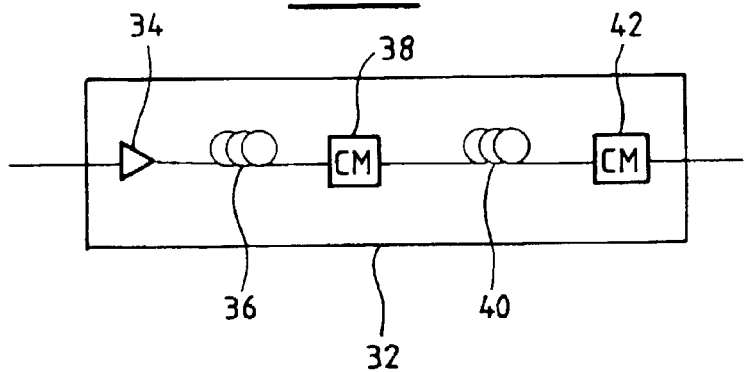
FIG_3

FIBRE FOR COMPENSATION OF THE CUMULATIVE CHROMATIC DISPERSION IN A FIBRE WITH NEGATIVE CHROMATIC DISPERSION

The present invention relates to the field of optical fibre transmission and, more specifically, compensation of the chromatic dispersion and chromatic dispersion slope in optical fibre transmission systems.

For optical fibres, the index profile is generally described according to the appearance of the graph of the function which associates the refractive index with the radius of the fibre. Conventionally the distance r to the centre of the fibre is represented on the x-axis and the difference between the refractive index and the refractive index of the cladding of the fibre is represented on the y-axis. "Stepped", "trapeziform" or "triangular" index profiles are thus spoken about, for graphs which have respective step, trapezium or triangle shapes. These curves generally represent the theoretical or reference profile of the fibre, the manufacturing constraints of the fibre possibly leading to a substantially different profile.

In the new high-speed and wavelength multiplexed transmission networks, it is advantageous to manage the chromatic dispersion, in particular for transmission speeds greater than or equal to 40 Gbit/s or 160 Gbit/s; the objective is to obtain, for all the wavelength values of the multiplex, a substantially zero cumulative chromatic dispersion on the link, so as to limit the broadening of the pulses; "cumulative chromatic dispersion" is the term for the integral of the chromatic dispersion over the length of the fibre; at constant chromatic dispersion, the cumulative chromatic dispersion is equal to the product of the chromatic dispersion and the length of the fibre. A cumulative value of a few tens of ps/nm for the dispersion is generally acceptable. It is also advantageous to avoid, in the vicinity of the wavelengths used in the system, zero values of the local chromatic dispersion, for which the non-linear effects are greater. Finally, it is also advantageous to limit the cumulative chromatic dispersion slope over the range of the multiplex so as to avoid or limit distortions between the channels of the multiplex. This slope is conventionally the derivative of the chromatic dispersion with respect to the wavelength.

There are conventionally used, as line fibres for optical fibre transmission systems, step-index fibres, also called SMF (Single Mode Fibre) fibres, or dispersion shifted fibres, also called NZ-DSF+ (Non-Zero Dispersion Shifted Fibre). NZ-DSF+ is the term for dispersion shifted fibres having a non-zero and positive chromatic dispersion for the wavelengths at which they are used, typically around 1550 nm. For these wavelengths, these fibres have a small chromatic dispersion, typically less than 11 ps/(nm.km) at 1550 nm, and a chromatic dispersion slope between 0.04 and 0.1 ps/(nm$^2$.km).

In order to compensate the chromatic dispersion and chromatic dispersion slope in SMF or NZ-DSF+ fibres used as line fibres, the use is known of small lengths of Dispersion Compensating Fibre (DCF). DCF fibres are described for example in U.S. Pat. No. 5,568,583 or U.S. Pat. No. 5,361,319, for compensation of the cumulative chromatic dispersion in an SMF fibre. EP-A-1 067 412 or the French patent application filed under number 01 06246246 describe dispersion compensating fibres adapted to compensate the chromatic dispersion and chromatic dispersion slope of a DSF fibre with positive chromatic dispersion in the transmission band. These known dispersion compensating fibres have, in the vicinity of a wavelength of 1550 nm, a negative chromatic dispersion and a negative chromatic dispersion slope.

The proposal has also been made to use, for compensation of the cumulative chromatic dispersion in a transmission system, a dispersion compensating fibre which is not single-mode. Thus, EP-A-0 886 574 proposes a dispersion compensating fibre having a rectangular profile with ring. This fibre is such that it supports a propagation not only in the LP01 mode, but also in the higher order LP02 mode. The chromatic dispersion has very large values, typically below −200 ps/(nm.km) for the LP02 mode, over a relatively broad range of wavelengths. The fibre is installed in the transmission system between two long-period gratings, which transform the LP01 mode into LP02 mode. WO-A-00 51268 describes a dispersion compensating fibre, used in LP02 mode in a transmission system having SMF fibre as the line fibre. A mode transformer is provided between the SMF fibre and the dispersion compensating fibre. As in EP-A-0 886 574, the dispersion compensating fibre has a negative chromatic dispersion in the wavelength range used in the transmission system.

Furthermore, a proposal has been made to use, in transmission systems, line fibre having a negative chromatic dispersion in the wavelength range used. This fibre is nowadays used for transoceanic links, where it equips the majority of WDM systems installed nowadays. An example experiment described in the literature on this model is experiment [1] of N. S. Bergano et al., "320 Gb/s WDM transmission (64×5 Gb/s) over 7,200 km using large mode fibre spans and chirped return to zero format", paper PD12 in proc. Optical Fiber Communication Conference (OFC'98), San Jose, Feb. 26, 1998.

A second example [2] is described by G. Vareille et al., "34×10 Gb/s, 50 GHz spacing DWDM) straight line transmission over 6380 km with full system implementation assessment", paper PD 18, in proc. Optical Fiber Communication Conference (OFC'99), San Diego, Feb. 25, 1999. In this second case, the parameters of the transmission fibre are supplied, with a chromatic dispersion of −2.34 ps/nm/km.

However, a type of fibre with negative dispersion also exists in terrestrial networks, supplied by Corning under the brand name "Corning LS", which has a chromatic dispersion of the order of −2.5 ps/nm/km. This fibre is used in experiment [3] of D. Garthe et al., "Demonstration of 80 Gb/s WDM transmission over 537 km of non-zero dispersion shifted fibre without in-line management of gain tilt equalization", in.Proc. European Conf. On Optical Communications (ECOC'96), paper TuD 1.5, pp. 151–154, Oslo, Norway, Sep., 15–19 1996.

For compensation of the cumulative negative chromatic dispersion in such fibres, the proposal has been made to use conventional step-index fibres, of the kind standardised in recommendation G.652. Such a fibre is for example explicitly used in experiment [2] mentioned above. In experiment [1], it is a slight variant of this fibre which is used as a compensating fibre, namely a pure silica core fibre (PSCF), the chromatic dispersion of which is close to 20 ps/nm/km.

One problem encountered in this case is that the step-index fibre has, in the wavelength band used, a positive chromatic dispersion slope, just like the line fibre. This forces, in very long systems, for each channel or each group of a few channels, the compensating fibre at the ends of the system to be tailored to suit. This compensating fibre is often standard fibre, such as in-line compensating fibre, but can also be DCF fibre, with negative dispersion. This solution is complex and increases the cost of the transmitting and receiving terminals. However, it is the solution most used at present, as described in the example of experiment [2], where eight different types of fibre are used in the transmitter for thirty four WDM channels actually used (one compensating fibre is therefore used to compensate an average of 4 to 5 channels).

There is therefore a need for a solution making it possible to compensate the cumulative chromatic dispersion and/or cumulative chromatic dispersion slope in a line fibre with negative chromatic dispersion.

The invention therefore proposes, in one embodiment, an optical fibre having, for a predetermined wavelength value and in a propagation mode other than the fundamental mode:
- a positive chromatic dispersion;
- a negative chromatic dispersion slope.

Advantageously, the propagation mode is a mode with circular symmetry; the predetermined wavelength can be 1550 nm. The fibre can also have one or more of the following characteristics
- an effective area greater than or equal to 50 $\mu m^2$ in the propagation mode;
- a chromatic dispersion greater than or equal to 4 ps/(nm.km), preferably greater than or equal to 10 ps/(nm.km) for the predetermined wavelength;
- a ratio of chromatic dispersion to chromatic dispersion slope between −90 and −20 nm for the predetermined wavelength;
- a ratio of chromatic dispersion to chromatic dispersion slope greater than or equal to −1 nm for the predetermined wavelength;
- a chromatic dispersion slope less than or equal to −0.1 ps/(nm$^2$.km), preferably less than or equal to −0.5 ps/(nm$^2$.km) for the predetermined wavelength;
- a rectangular index profile with a sunken trench and a ring.

The invention also proposes a transmission system, having:
- a transmitter of optical signals in a predetermined wavelength range;
- a section of a first optical fibre which is single-mode in the wavelength range and having in the wavelength range a negative chromatic dispersion and a positive chromatic dispersion slope;
- a mode transformer;
- a section of a second optical fibre in which the transformed signals propagate in a higher order mode, the second optical fibre having in the wavelength range a positive chromatic dispersion and a negative chromatic dispersion slope.

Advantageously, the higher order mode has a circular symmetry in the second fibre. This second fibre can have, in the higher order propagation mode and in the wavelength range, an effective area greater than or equal to 50 $\mu m^2$. It is also advantageous for the wavelength range to contain the wavelength 1550 nm.

In one embodiment, the second fibre has, in the wavelength range, a chromatic dispersion greater than or equal to 4 ps/(nm.km), preferably greater than or equal to 10 ps/(nm.km). In this case, the second fibre can have, in the wavelength range, a ratio of chromatic dispersion to chromatic dispersion slope between −90 and −20 nm.

In another embodiment, the system furthermore comprises a third fibre having, in the fundamental mode and in the wavelength range:
- a positive chromatic dispersion;
- a positive chromatic dispersion slope.

In this case, it is advantageous for the second fibre to have a ratio of chromatic dispersion to chromatic dispersion slope greater than or equal to −1 nm. This second fibre can then have a chromatic dispersion slope less than or equal to −0.1 ps/(nm$^2$.km), preferably less than or equal to −0.5 ps/(nm$^2$.km). An NZ-DSF− fibre can be used for the first fibre.

Preferably, the absolute value of the cumulative chromatic dispersion in the wavelength range remains less than 50 ps/nm and preferably less than 25 ps/nm.

Figure 5:
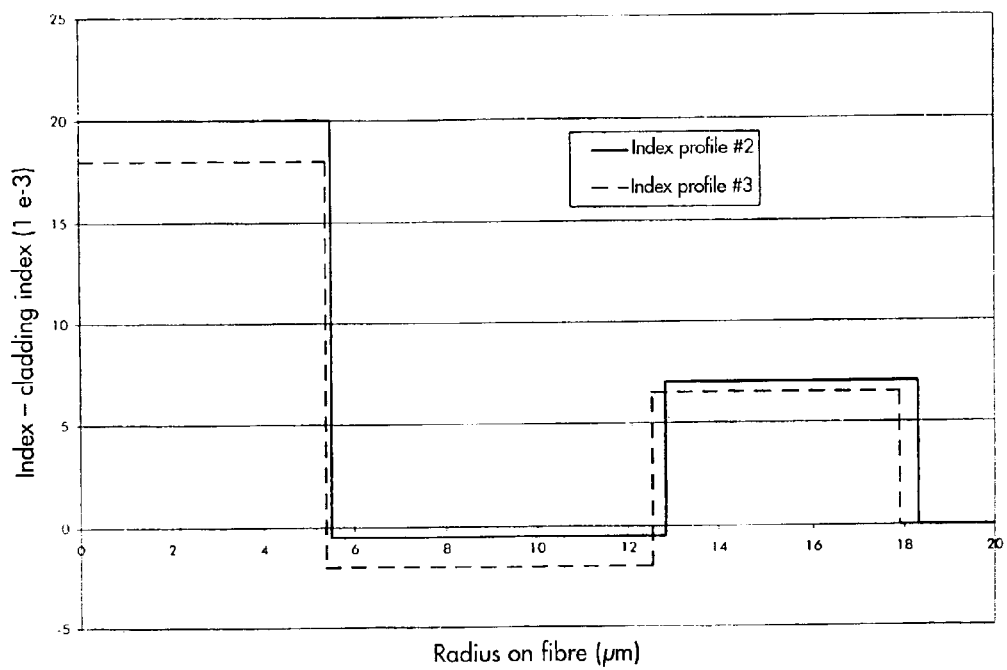

Other characteristics and advantages of the invention will emerge from a reading of the following description of embodiments of the invention, given by way of example and with reference to the accompanying drawings, which show FIG. 1, a schematic representation of a transmission system according to one embodiment of the invention;

FIG. 2, a schematic representation of a transmission system according to another embodiment of the invention;

FIG. 3, a schematic representation of a repeater of a transmission system according to yet another embodiment of the invention;

FIG. 4, a graphical representation of the reference profile of a dispersion compensating fibre according to the invention and of the amplitude of the LP02 mode in the fibre;

FIG. 5, a graphical representation of the reference profile of two fibres according to the invention.

In order to compensate the cumulative negative chromatic dispersion and cumulative positive chromatic dispersion slope in an optical fibre, the invention proposes the use of an optical fibre in a mode other than the fundamental mode, having in this other mode a positive chromatic dispersion and a negative chromatic dispersion slope, for the wavelengths used in the transmission system.

The fact that the dispersion compensating fibre has a negative chromatic dispersion slope makes it possible to compensate, not only the cumulative chromatic dispersion in the optical fibre with negative chromatic dispersion, but also the cumulative chromatic dispersion slope in this fibre.

The fact that the dispersion compensating fibre is used in a transmission mode other than the fundamental mode allows it to have, at the wavelengths under consideration, a positive chromatic dispersion and a negative chromatic dispersion slope.

FIG. 1 is a schematic representation of a transmission system according to a first embodiment of the invention; in this embodiment, compensation of the chromatic dispersion and of the chromatic dispersion slope takes place in compensation modules.

FIG. 1 depicts the transmitter TX 2 and the receiver RX 4 of the transmission system, between which there extends the line fibre—that is to say the fibre which extends along the transmission system. The line fibre is formed of spans 61 to 6$n$, separated by repeaters 81 to 8$n$−1. The line fibre has, for the wavelengths used in the transmission system, a negative chromatic dispersion and a positive chromatic dispersion slope. Each repeater 8$i$ has an amplifier 10$i$, the structure of which has no effect on the operation of the invention, and is therefore not described. At the output of the amplifier a mode transformer 12$i$ is provided, followed by a section 14$i$ of a dispersion compensating fibre according to the invention. At the output of the section 14$i$ another mode transformer 16$i$ is provided; the output of the mode transformer constitutes the output of the repeater 8$i$ and is connected to the next span 6$i$+1 of line fibre.

The light coming from the line fibre is therefore amplified, and then passes through the mode transformer 12$i$; the function of the latter is to transform the incident light, which propagates in the amplification fibre and in the line fibre in the fundamental mode LP01, in order to convert it into the mode LP02 or a higher order mode. As a mode transformer, use can be made of all the devices known as such for this function, such as long-period gratings. The light is therefore transmitted through the dispersion compensating fibre 14$i$ in the mode LP02 and/or higher order modes. Propagation through the dispersion compensating fibre makes it possible to compensate the cumulative chromatic dispersion and cumulative chromatic dispersion slope in the line fibre, as explained below. At the output of the dispersion compensating fibre 14$i$, the mode transformer 16$i$ converts the light into the fundamental mode, for subsequent propagation in the line fibre.

Modifications to the transmission system of FIG. 1 are possible: thus filters, or an amplifier downstream of the dispersion compensating fibre, can be provided; the dispersion compensating fibre could also be used simultaneously as an amplification fibre by doping it with a rare earth. In the example of FIG. 1, the devices 8$i$ are termed "repeaters", in that they comprise an amplifier; the amplifiers and the sections of dispersion compensating fibres could also be separated, a box comprising a dispersion compensating fibre (with or without amplifier) then possibly being called a "compensation module".

FIG. 2 is a schematic representation of a transmission system according to a second embodiment of the invention; in this embodiment, the fibre of the invention is used as line fibre; in other words, compensation of the chromatic dispersion and of the chromatic dispersion slope takes place not in compensation modules but during transmission, along the transmission system. In this embodiment, it can furthermore be useful to ensure that the stray coupling between modes (mixing by interference, resulting from imperfect transformation of the modes) remains small. FIG. 2 shows the transmitter TX 20 and the receiver RX 22 of the transmission system, between which the line fibre extends. The line fibre comprises spans 241 to 24$n$ of a fibre of a first type having, for the wavelengths used in the transmission system, a negative chromatic dispersion and a positive chromatic dispersion slope. The line fibre also comprises spans 261 to 26$n$ of a fibre of a second type. This fibre has a positive chromatic dispersion and a negative chromatic dispersion slope for the wavelengths used in the transmission system and in one or more modes other than the fundamental mode.

Between a span of fibre 24$i$ of the first type and a span of fibre 26$i$ of the second type, at least one mode transformer 28$i$ is provided. Like the mode transformer 12$i$ of FIG. 1, the function of the mode transformer is to transform the light propagating in the fundamental mode through the fibre 24$i$ so that it propagates in the fibre 26$i$ in the mode LP02 or another higher order mode.

Between a span of fibre 26$i$ of the second type and a span of fibre 24$i$+1 of the first type, at least one mode transformer 30$i$ is provided. Like the mode transformer 16$i$ of FIG. 1, the function of the mode transformer 30$i$ is to transform the light propagating in the mode LP02 or in another higher order mode through the fibre 26$i$, in order to restore it to the fundamental mode for subsequent transmission through the fibre 24$i$+1.

No description has been given in the figure of the other elements, such as amplifiers, filters or others which can be useful in the transmission system.

The light transmitted by the transmitter propagates through the fibre 24$i$ of the first type in the fundamental mode; it accumulates therein a negative chromatic dispersion, with a shift between the various channels on account of the positive chromatic dispersion slope. At the output of a span 24$i$ of fibre of the first type, the light passes through the mode transformer 28$i$; the latter transforms the incident light in order to convert it into the mode LP02 or a higher order mode. In the fibre 26$i$, the chromatic dispersion is positive, so that the cumulative chromatic dispersion increases, thus compensating the cumulative chromatic dispersion in the fibre of the first type. The disparity between the channels caused by the positive chromatic dispersion slope in the fibre of the first type decreases, on account of the chromatic dispersion slope in the fibre of the second type.

In the embodiment of FIG. 2, it is improper to describe the fibre of the second type as dispersion compensating fibre—inasmuch as the fibre of the second type is also used as line fibre. The fibre of the first type also compensates the cumulative dispersion in the fibre of the second type. The usual term for the fibre of the second type is Reverse Dispersion Fibre or "RDF", this indicating that the fibres of the first and the second type have chromatic dispersions of opposite signs. The term dispersion compensating fibre is nevertheless used to describe the fibre of the second type.

In the embodiment of FIG. 1, the dispersion compensating fibre does not contribute towards the length of the transmission system; in other words, the ratio between the length of the optical fibre outside the repeaters and the total length of the transmission system is close to 1. The dispersion compensating fibre is therefore not used as line fibre. In the embodiment of FIG. 2, on the contrary, the dispersion compensating fibre contributes towards the length of the transmission system: the ratio between the length of the dispersion compensating fibre and the total length of the transmission system is of the order of ⅓ (the case of the example given with compensation on LP02, dispersion of +15 ps/nm/km and C/C' of −90 nm) perhaps even of the order of ¹⁄₁₀ (the case of the example given with compensation on LP03, dispersion of +20 ps/nm/km and C/C' of −20 nm). The dispersion compensating fibre is used as line fibre.

FIG. 3 shows a schematic representation of a repeater of a transmission system according to yet another embodiment of the invention. The repeater of FIG. 3 can be used in a transmission system of the kind of that of FIG. 1. The repeater of FIG. 3 comprises, unlike that of FIG. 1, two sections of compensating fibre. The repeater 32 therefore has an amplifier 34, followed by a first section 36 of dispersion compensating fibre. This first section of dispersion compensating fibre can be formed of a dispersion compensating fibre of the prior art, able to compensate the chromatic dispersion in the line fibre—without however compensating the chromatic dispersion slope. This fibre typically has a positive chromatic dispersion and a positive chromatic dispersion slope (for a line fibre with negative chromatic dispersion); it is single-mode in the wavelength range under consideration. A mode transformer 38 is provided next, followed by a second section of dispersion compensating fibre 40. The fibre of this second section has a positive chromatic dispersion and a negative chromatic dispersion slope for the wavelengths used in the transmission system and in one or more modes other than the fundamental mode. At the output of this second section, another mode transformer 42 is provided.

Like the mode transformer 12$i$ of FIG. 1, the function of the mode transformer 38 is to transform the light propagating in the fundamental mode through the fibre 36 so that it propagates in the fibre 40 in the mode LP02 or another chosen higher order mode.

Like the mode transformer 16$i$ of FIG. 1, the function of the mode transformer 42 is to transform the light propagating in the mode LP02 or another higher order mode through the fibre 40 in order to restore it to the fundamental mode for subsequent transmission through the line fibre, at the output of the repeater.

The light coming from the line fibre is therefore amplified, and then passes through the first section of dispersion compensating fibres: propagation through the dispersion compensating fibre makes it possible to compensate the cumulative chromatic dispersion and to partially compensate the cumulative chromatic dispersion slope in the line fibre. The mode transformer 38 next transforms the light, so that it propagates in the second section of line fibre in the mode LP02 or a higher order mode. In the second section of dispersion compensating fibre, the residual chromatic dispersion slope is compensated. At the output of this second section, the mode transformer 42 converts the light into the fundamental mode, for subsequent propagation in the line fibre.

As above, other amplifiers or filters could be provided; the order of the fibres could be reversed.

In the embodiment of FIG. 1 or 2, just as in that of FIG. 3, the characteristics of the fibre depend on the fibre compensated as regards dispersion or dispersion slope. In the embodiment of FIG. 1 or 2, it is advantageous for the fibre to have one or more of the following characteristics, for a wavelength in the band used in the transmission system:
  a ratio of chromatic dispersion to chromatic dispersion slope close to that of the line fibre; for an NZ-DSF– line fibre, a ratio between –90 and –20 nm is preferably chosen; these values correspond to certain current fibres, but values of the ratio outside this range can also be envisaged;
  a chromatic dispersion as large as possible; in fact, the higher the chromatic dispersion of the chromatic dispersion compensating fibre used, the smaller the length of this fibre. In the case of FIG. 2, a chromatic dispersion greater than or equal to twice the absolute value of the chromatic dispersion of the line fibre can be chosen. This value ensures that the length of the compensating fibre is at most half the length of the line fibre. For an NZ-DSF– fibre, values of chromatic dispersion greater than or equal to 4 ps/(nm.km), perhaps even greater than or equal to 10 ps/(nm.km), are found. Values of chromatic dispersion greater than or equal to 10 ps/(nm.km), perhaps even 20 ps/(nm.km), are appropriate for a system of the kind of that of FIG. 2;
  a negative chromatic dispersion slope;
  an effective area greater than 50 $\mu m^2$ in the propagation mode or modes used.

The proposed range of the ratio of chromatic dispersion to chromatic dispersion slope allows good compensation of the fibres with negative chromatic dispersion of the prior art. The proposed value of the effective area limits the non-linear losses in the fibre.

In the embodiment of FIG. 3, the first section of compensating fibre 36 almost completely compensates the cumulative chromatic dispersion in the line fibre. At the input of the second section of dispersion compensating fibre, the cumulative chromatic dispersion is small. The function of the second section of dispersion compensating fibre is therefore to compensate the residual chromatic dispersion slope. It is then advantageous to choose a fibre which has
  a ratio of chromatic dispersion to chromatic dispersion slope which is negative and small; values of this ratio greater than or equal to –1 nm are suitable;
  a chromatic dispersion slope which is negative and as small as possible; in fact, the higher (in terms of absolute value) the chromatic dispersion slope of the chromatic dispersion compensating fibre used, the smaller the length of the second section of this fibre. A chromatic dispersion slope less than or equal to –0.1 ps/(nm$^2$.km), perhaps even better, less than or equal to –0.5 ps/(nm$^2$.km), can be chosen. This second value is advantageous, not only in that it is greater in terms of absolute value, but also on account of it making it possible, with the profiles of FIGS. 4 and 5, to obtain varied values of the ratios of chromatic dispersion to chromatic dispersion slope;
  an effective area greater than 50 $\mu m^2$ in the propagation mode or modes used.

In the examples of FIG. 1, 2 or 3, it is advantageous for the propagation mode in the fibre according to the invention to have the same symmetry as the propagation mode in the line fibre (or as in the first dispersion compensating fibre). If these modes have a circular symmetry—like the majority of fundamental modes of the fibres of the prior art—a higher order propagation mode also having a circular symmetry can be chosen for the fibre of the invention. The examples of propagation in modes LP02 and LP03 are not limitative and the mode LP05 or other higher order modes with circular symmetry could for example be used.

FIG. 4 is a graphical representation of the reference profile of a dispersion compensating fibre according to the invention and of the amplitude of the mode LP02 in the fibre. In the example, this fibre is intended to be used in a wavelength range of 1530 to 1565 nm, that is to say in band C.

In FIG. 4, the distance to the centre of the fibre, in micrometres, has been plotted on the x-axis; on the left-hand y-axis of the figure there appears the difference in index with the cladding of the fibre. On the right-hand y-axis of the figure there appears the amplitude of the light, normalised to the maximum amplitude. The figure shows the reference profile of the fibre, which is a rectangular index profile with a ring. The fibre therefore has, as depicted in the figure,
  a central part of radius r1 with a substantially constant index, having a positive difference $\Delta n1$ with the index of the cladding;
  an annular part extending between the radii r1 and r2, having a negative difference $\Delta n2$ with the index of the cladding;
  the whole constituting an index profile referred to as "rectangular with a sunken or depressed trench". Around the sunken trench, the fibre has, between the radii r2 and r3, a ring, that is to say a part with index greater than the index of the cladding, hence the term rectangular profile with a sunken trench and a ring. The difference between the index of the ring and the index of the cladding is denoted $\Delta n3$. The values of the various parameters are summarised in the following table.

TABLE I

| $r_1$ ($\mu$m) | $r_2$ ($\mu$m) | $r_3$ ($\mu$m) | $10^3 \Delta n_1$ | $10^3 \Delta n_2$ | $10^3 \Delta n_3$ |
|---|---|---|---|---|---|
| 5.8 | 13.5 | 19 | 18.5 | –1.4 | 7 |

With this reference profile, the fibre has the following characteristics at a wavelength of 1550 nm:
  a chromatic dispersion of 15 ps/(nm.km);
  a ratio of chromatic dispersion to chromatic dispersion slope of –90 nm;
  an effective area of 65 $\mu m^2$ in the mode LP02.

The fibre has a cut-off wavelength of 2 μm for the mode LP02, which is clearly liable to allow in band C a propagation in the mode LP02. The choice of propagation mode is advantageous, inasmuch as it is the first higher order mode which has the same symmetries as the fundamental mode; other modes can also be used, as in the examples proposed below.

The negative values of the chromatic dispersion and the chromatic dispersion slope make it possible to compensate the negative chromatic dispersion and the positive chromatic dispersion slope of an NZ-DSF− fibre; the more positive the value of the chromatic dispersion, the more the length of compensating fibre necessary to compensate the cumulative chromatic dispersion in the line fibre decreases; a large value of chromatic dispersion is particularly useful in the embodiment of FIG. 1.

The value of the effective area limits the losses or the non-linear effects capable of appearing at high power of the signal propagating in the compensating fibre.

An example is now given of a transmission system using the fibre of FIG. 4 to compensate the chromatic dispersion and chromatic dispersion slope of an NZ-DSF− fibre of the prior art, in the configuration of FIG. 1. The NZ-DSF− fibre has, for a wavelength of 1550 nm:

a chromatic dispersion of the order of −4 ps/nm/km;
a ratio of chromatic dispersion to chromatic dispersion slope of −90 nm;

The NZ-DSF− fibre and the chromatic dispersion compensating fibre therefore have almost identical values of the ratio of chromatic dispersion to chromatic dispersion slope. This ensures that a compensation of the chromatic dispersion will lead at the same time to a compensation of the chromatic dispersion slope. A transmission system can therefore have spans of NZ-DSF− fibre, 50 km long (typical length of a submarine segment),
compensated in terms of chromatic dispersion by compensation modules or spans with a length of 13.5 km of fibre of FIG. 4.

The cumulative chromatic dispersion and cumulative chromatic dispersion slope in a span of line fibre and in a section of dispersion compensating fibre have the values supplied in Table II, for different values of wavelength in band C. Considering the values proposed in the system, the cumulative chromatic dispersion remains lower in band C than −17 ps/nm for the proposed arrangement: the length of compensating fibre is adapted so as to minimise the chromatic dispersion at 1550 nm. It is also possible to adapt the length of compensating fibre so as to reduce the peak-to-peak cumulative dispersion disparity over the spectral band. For band C and the proposed profile, a fibre length of 14 km for 50 km of transmission makes it possible to make the residual dispersion uniform over the whole band (see Table II).

TABLE II

|  | 1530 nm | 1550 nm | 1565 nm |
| --- | --- | --- | --- |
| Cumulative C (ps/nm) Length 13.5 km | −17.12 | −0.47 | −11.15 |
| Cumulative C (ps/nm) Length 14 km | −8.61 | 6.92 | −5.46 |

FIG. 5 shows a graphical representation of the reference profile of two fibres according to the invention; the representation conventions are the same as in FIG. 4. The fibres are again fibres with a rectangular reference profile with a sunken trench and a ring. The values of the various parameters are summarised in the following table.

TABLE III

| Fibre | $r_1$ (μm) | $r_2$ (μm) | $r_3$ (μm) | $10^3 \Delta n_1$ | $10^3 \Delta n_2$ | $10^3 \Delta n_3$ |
| --- | --- | --- | --- | --- | --- | --- |
| Fibre 2 | 5.49 | 12.81 | 18.3 | 20 | −0.5 | 7 |
| Fibre 3 | 5.37 | 12.53 | 17.9 | 18 | −2 | 6.5 |

Fibre 2 is designed to be used in band C, with a propagation in mode LP02. It has, at a wavelength of 1550 nm, a chromatic dispersion of the order of 5 ps/(nm.km), for a ratio of chromatic dispersion to chromatic dispersion slope of the order of −20 nm. It has an effective area of 62 μm². This fibre is well suited to compensation of the chromatic dispersion and chromatic dispersion slope of a fibre of the prior art mentioned in reference [1].

This type of compensating fibre can also be used with a low dispersion value for compensation of the slope alone. The wavelength corresponding to zero-crossing of the dispersion is determined by the definition of the index profile.

Fibre 3 is designed to be used in band C, with a propagation in mode LP03. It has, at a wavelength of 1550 nm, a chromatic dispersion of the order of 20 ps/(nm.km), for a ratio of chromatic dispersion to chromatic dispersion slope of the order of −20 nm. It has an effective area of 62 μm², for a propagation in mode LP03. This fibre is suited to compensation of the chromatic dispersion of the same fibres of the prior art; however, as it has a greater chromatic dispersion, the necessary dispersion compensating fibre wavelength is lower, ceteris paribus.

Qualitatively speaking, it turns out that a small chromatic dispersion slope makes it possible to obtain larger values of chromatic dispersion; such larger values allow compensation over shorter distances.

The fibre of the invention can be manufactured by persons skilled in the art using known techniques, such as MCVD, OVD or the other techniques commonly used for the manufacture of optical fibres.

Of course, the invention is not limited to the examples proposed above; the dispersion compensating fibres can have profiles different from those of FIGS. 4 and 5; the line fibres can also be different from the NZ-DSF− fibre given as an example. This is because these fibres have in band C a negative chromatic dispersion and a positive chromatic dispersion slope; the invention could also be applied to NZ-DSF+ fibres used in wavelength ranges below the zero-chromatic-dispersion wavelength λ0; in such ranges, the chromatic dispersion is negative and the chromatic dispersion slope remains positive.

In the examples proposed above, it turns out that both the chromatic dispersion and the chromatic dispersion slope are completely compensated; a residual chromatic dispersion or a residual chromatic dispersion slope can also be accepted in transmission systems. The structure of the transmission system can differ from that depicted in FIG. 1, 2 or 3.

The examples are given in band C; the above teaching can be applied to other wavelength bands.

What is claimed is:

1. An optical fibre having, for a predetermined wavelength value and in a propagation mode other than the fundamental mode:
    a positive chromatic dispersion;
    a negative chromatic dispersion slope, wherein it has, for the predetermined wavelength, a ratio of chromatic dispersion to chromatic dispersion slope between −90 and −20 nm.

2. The fibre according to claim 1, wherein the propagation mode is a mode with circular symmetry.

3. The fibre according to claim 1, wherein it has, in the propagation mode, an effective area greater than or equal to 50 $\mu m^2$.

4. The fibre according to claim 1, wherein the predetermined wavelength is equal to 1550 nm.

5. The fibre according to claim 1, wherein it has, for the predetermined wavelength, a chromatic dispersion greater than or equal to 4 ps/(nm.km).

6. The fibre according to claim 1, wherein it has, for the predetermined wavelength, a ratio of chromatic dispersion to chromatic dispersion slope less than or equal to −1 nm.

7. The fibre according to claim 6, wherein it has, for the predetermined wavelength, a chromatic dispersion slope less than or equal to −0.1 ps/($nm^2$.km).

8. The fibre according to claim 6, wherein it has, for the predetermined wavelength, a chromatic dispersion slope preferably less than or equal to −0.5 ps/($nm^2$.km).

9. The fibre according to claim 1, wherein it has, for the predetermined wavelength, a rectangular index profile with a sunken trench and a ring.

10. The fibre according to claim 1, wherein it has, for the predetermined wavelength, a chromatic dispersion greater than or equal to 10 ps/(nm.km).

* * * * *